(12) United States Patent
Jonner et al.

(10) Patent No.: US 6,366,024 B1
(45) Date of Patent: Apr. 2, 2002

(54) METHOD FOR PROVIDING A QUANTITY REPRESENTING THE LONGITUDINAL INCLINATION OF A VEHICLE

(75) Inventors: Wolf-Dieter Jonner, Beilstein; Reiner Folke, Kornwestheim; Elmar Mueller, Markgroeningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/473,189

(22) Filed: Dec. 28, 1999

(30) Foreign Application Priority Data

Dec. 28, 1998 (DE) .......................... 198 60 400

(51) Int. Cl.⁷ .............................................. B60Q 1/26
(52) U.S. Cl. ........................ 315/82; 315/77; 307/10.8; 340/468
(58) Field of Search ............................. 315/82, 77, 80; 362/37, 71, 466, 464; 307/10.8; 340/441, 469, 438, 468

(56) References Cited

U.S. PATENT DOCUMENTS

| 3,973,804 A | | 8/1976 | Engfer et al. ............... 303/2 |
|---|---|---|---|
| 4,237,524 A | | 12/1980 | Hundemer ................... 362/71 |
| 5,877,680 A | * | 3/1999 | Okuchi et al. ............... 315/82 |
| 5,896,011 A | * | 4/1999 | Zillgitt ....................... 315/82 |
| 5,909,949 A | * | 6/1999 | Gotoh ......................... 362/37 |
| 6,160,476 A | * | 12/2000 | Ponziani ................... 307/10.8 |

FOREIGN PATENT DOCUMENTS

| DE | 23 33 983 | 1/1975 |
|---|---|---|
| DE | 43 40 442 | 6/1995 |
| DE | 197 04 427 | 8/1998 |

* cited by examiner

Primary Examiner—Don Wong
Assistant Examiner—Wilson Lee
(74) Attorney, Agent, or Firm—Kenyon & Kenyon

(57) ABSTRACT

A method for providing a signal, representing the longitudinal inclination of a vehicle, for a control unit for the slip control and/or for the control of a quantity describing the yaw rate of the vehicle, measured quantities which can be acquired and processed for ascertaining a signal representing a longitudinal inclination of the vehicle, and/or the ascertained signal representing the longitudinal inclination being transmitted from a control device for the headlight-leveling control to the control unit for the slip control and/or for the control of the quantity describing the yaw rate.

17 Claims, 2 Drawing Sheets

METHOD FOR PROVIDING A QUANTITY REPRESENTING THE LONGITUDINAL INCLINATION OF A VEHICLE

FIELD OF THE INVENTION

The present invention relates to a method for providing a quantity representing the longitudinal inclination of a vehicle, and/or a signal representing the longitudinal inclination of a vehicle, for a control unit for the slip control of the vehicle or a control unit for the control of a quantity describing the yaw rate of the vehicle. The present invention also relates to a control unit for the slip control or for the control of a quantity describing the yaw rate of a vehicle, as well as a control unit for controlling the headlight level of a vehicle, having means for generating and processing a quantity and/or a corresponding signal representing the longitudinal inclination of the vehicle. To be understood by the headlight-leveling control is the control of the headlights, in particular the low-beam headlights, provided on a vehicle.

BACKGROUND INFORMATION

Headlight systems of modern motor vehicles are frequently designed with xenon gas-discharge lamps as a central component (Litronic system). Such lamps have high lighting effectiveness, accompanied by the least front-area requirement. Because of legal regulations, such xenon lamps must be equipped with automatic headlight-leveling control. For that purpose, using Hall sensors for example, it is possible to perform measurements of the spring-deflection depth at the front and rear axle of the motor vehicle. In doing this, the Hall sensor measures the twisting of a torsion bar or a stabilizer that is in operative connection with the front and rear axle, respectively. The longitudinal inclination of the vehicle is detected by the use of two such measuring points. Thus both a spring deflection in the rear-axle area produced by loading (static spring deflection), as well as a spring deflection caused by pitching such as during a braking operation (dynamic spring deflection) are taken into account in the headlight-leveling control.

German Patent Application No. 197 04 427 describes a device for controlling the headlight level (light range) of vehicle headlights having adjusting devices, allocated to the headlights, for adjusting the headlight level, with a transmitting device used for emitting at least one electromagnetic beam of light which illuminates an area in front of the vehicle. The device also has an opto-electronic sensor device in which at least the one illuminated area is imaged as a pixel, as well as an evaluation device which evaluates the position of the at least one illuminated area, and from this, forms a signal which is compared to a setpoint signal representing a correct setting of the headlight level. In response to a deviation between the prevailing signal and the setpoint signal, the adjusting devices are driven to eliminate the deviations, the position of the at least one pixel in relation to at least one reference position in the sensor device being evaluated by the evaluation device, and a signal being formed for it.

German Patent No. 23 33 983 describes a device for controlling the level of vehicle headlights. This device has a sensor device in the area of the front axle and in the area of the rear axle, respectively, which at least indirectly detect the change in position of the vehicle in the region of the front axle and rear axle with respect to the roadway. In this case, the sensor devices are ultrasonic sensors which have a sensor and a receiver. Ultrasonic radiation is emitted toward the roadway by the sensor, and ultrasonic radiation reflected at the roadway is detected by the receiver. The ultrasonic sensors are connected to an evaluation device which, from the signals of the sensors, determines the respective distance of the sensors and thus of the vehicle bodywork from the roadway. The evaluation device determines the inclination of the vehicle based on the distance of the sensors at both axles, and drives the adjusting devices allocated to the headlights in such a way that the headlight level is kept at least approximately constant regardless of the vehicle inclination.

The use of spring-deflection-path signals is also known in connection with anti-lock and traction control systems (ABS/ASR systems). For example, German Patent No. 43 40 442 describes an anti-lock and/or traction control system, in which the brake pressure is varied as a function of the wheel-movement behavior along the lines of avoiding locking or a free spinning of the driven wheels, and a signal which represents the nature of the roadway surface is also supplied to this system, this signal effecting a change in at least one control parameter within the control system. According to this document, spring-deflection-path signals are used in particular as the signal (unevenness measure) representing the roadway surface.

A disadvantage in the case of customary motor vehicles is that, for reasons of cost, only estimation quantities for the longitudinal inclination of the vehicle are used for control devices for regulating slip or for regulating a quantity describing the yaw rate of the vehicle. A continuous provision of prevailing measured quantities which accurately and reliably represent the longitudinal inclination of the vehicle is unknown in such systems.

SUMMARY OF THE INVENTION

An object of the present invention is to provide a cost-effective possibility for supplying accurate, current-status measured quantities with respect to the longitudinal inclination of the motor vehicle to control devices for slip control (ABS and/or ASR) or for controlling a quantity describing the yaw rate of the vehicle (operating-dynamics control FDR or electronic stability program ESP).

This objective is achieved by a method for providing a signal, representing the longitudinal inclination of a vehicle, for a control unit for slip control and/or for controlling a quantity describing the yaw rate of the vehicle. Measured quantities which can be acquired and processed for ascertaining a signal representing a longitudinal inclination of the vehicle, and/or the ascertained signal representing the longitudinal inclination are/is transmitted by a control device for the headlight-leveling control to the control unit for the slip control and/or for the control of the quantity describing the yaw rate.

According to the present invention, it is possible to transmit quantities describing the longitudinal inclination of the vehicle, which can be acquired and processed by a control unit for the headlight-leveling control of the vehicle, or a signal which represents the longitudinal inclination of the vehicle and is generated from these measured quantities by the control unit for the headlight-leveling control, to an operating-dynamics system (slip-control system and/or system for controlling a quantity describing the yaw rate of the vehicle) and to use them there to improve the control. The following influence possibilities, which can be optimized with the aid of such information about loading or inclination angle, are named by way of example: The information about the longitudinal inclination is usable in reference value generation, i.e., in determination of the vehicle velocity over ground (over road surface traveled), in particular for vehicles which, in the drive case, utilize information about the output engine power (4-wheel vehicles). In this case, due to the information about the loading or the longitudinal inclination of the motor vehicle, the engine output can be set in an improved manner in a relation to the propulsive power. In addition, in the case of an ABS braking, the dynamic axle-load shift, and thus the change in the wheel load, can be estimated using the information about the longitudinal inclination. Thus, it is possible to guide the operating point of the ABS controller more quickly to its optimum, such as in the case of a sudden change in the coefficient of friction.

Inferences can be drawn about uphill or downhill grade using the information about the inclination angle of the vehicle existing when the vehicle is at rest, thus permitting optimization of the operating point of an ASR/ABD system during a start from rest. ABD denotes an automatic brake differential. Furthermore, utilizing the constantly updated information about the longitudinal inclination, the brake-application performance can be improved by a pressure build-up adapted to the change in the wheel load. Due to this, it is possible to attain a reduction of pitching vibrations, and thus a reduction of the braking distance and an improvement in comfort accompanying this.

According to the present invention, it is also possible to undertake a correction of mass in the case of physical control formulations. The method of the present invention offers support when determining the optimum braking-force distribution, as well as a correction of the reference gradient during brake application. Plausibility relationships with respect to the wheel performance, and thus an optimization of the vehicle reference value in drive and braking processes, are also ascertainable.

According to one advantageous refinement of the method of the present invention, the depths of the vehicle spring deflection in its front and rear axle area are used as the measured quantities representing the longitudinal inclination of the vehicle. The spring-deflection paths thus ascertained and/or the loading or longitudinal-inclination information determined on the basis of the spring-deflection paths are easily transferable to an operating-dynamics system.

Hall sensors which measure the twisting of a torsion bar or stabilizer are expediently used to ascertain the spring-deflection depths. Very precise and reliable measuring results can be obtained with these means.

According to another preferred specific embodiment of the method of the present invention, gradient sensors are used to determine the quantities representing the longitudinal inclination of the vehicle. Such sensors prove to be very sturdy and reliable.

The object underlying the present invention is also achieved by a control unit for the slip control and/or for the control of a quantity describing the yaw rate of a vehicle, the control unit including means for the reception and processing of measured quantities, from which a signal can be ascertained representing the longitudinal inclination of the vehicle, or for the reception and processing of a signal determined on the basis of this measured quantity and representing the longitudinal inclination of the vehicle, from a control unit for the headlight-leveling control.

The object underlying the present invention is further achieved by a control unit for the headlight-leveling control of a vehicle, having means for acquiring measured quantities, based on which a signal can be determined representing the longitudinal inclination of the vehicle, and having means for generating a signal representing the longitudinal inclination of the vehicle on the basis of the acquired measured quantities, the control unit including means for transmitting the acquired measured quantities and/or the generated signal to a control unit for the slip control and/or for the control of a quantity describing the yaw rate of the vehicle.

By providing the control units of the present invention for the slip control or for the control of a quantity describing the yaw rate of the vehicle, and for the headlight-leveling control of a vehicle, it is possible to use existing measured quantities or signals with respect to the longitudinal inclination of the vehicle for two different functions of a motor vehicle. By this means, both functions, namely the slip control and/or the control of a quantity describing the yaw rate of the vehicle, and the headlight-leveling control can be optimized while saving on sensor components and computing expenditure, without additional outlay.

DETAILED DESCRIPTION

Figure 1:
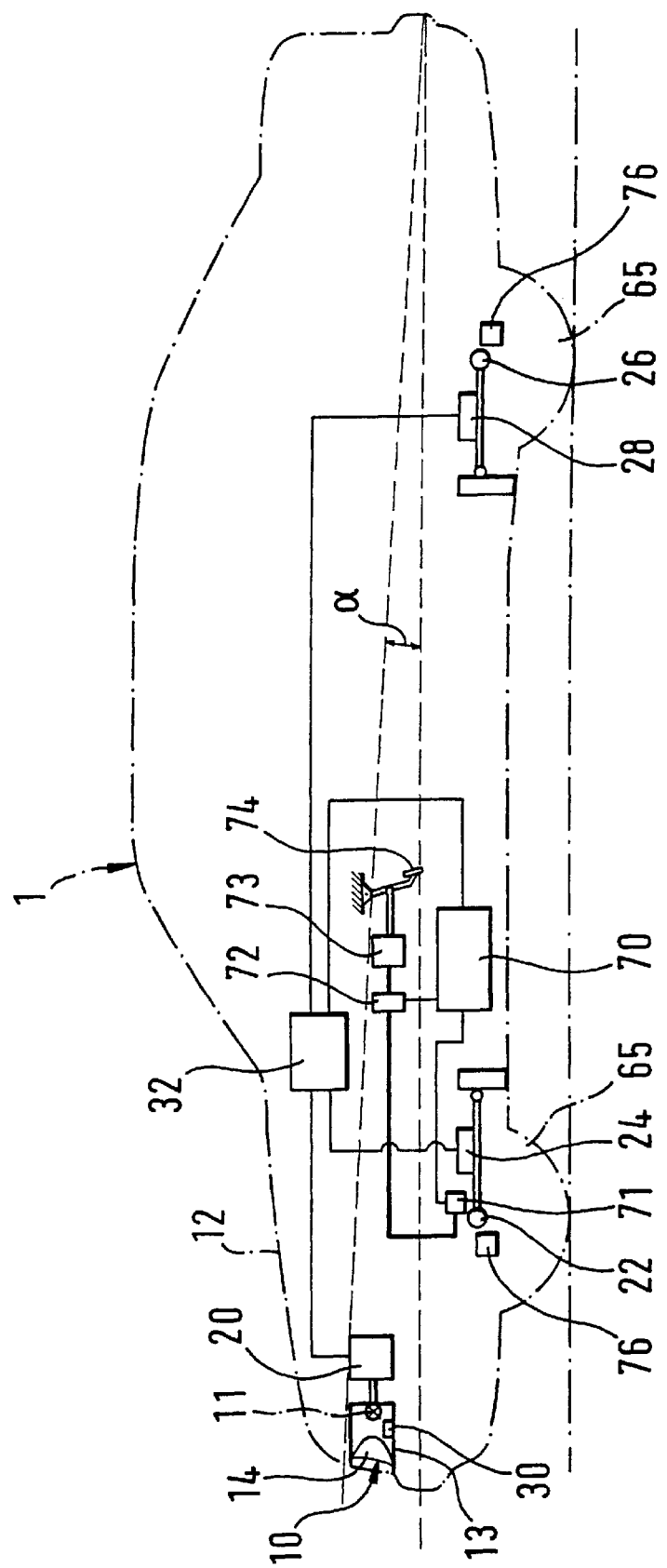
FIG. 1 shows a simplified representation of a vehicle in longitudinal cross-section.

A vehicle, designated as a whole in FIG. 1 by numeral 1, in particular a motor vehicle, in known manner has at least two low-beam headlights 10 at its front end, of which only one is discernible in FIG. 1. Headlights 10 are joined in known manner to the bodywork of vehicle 1, in particular to its body 12. In response to a change in the inclination $\alpha$ of the vehicle, the inclination of headlights 10, and thus the light level (range) of the light bundle emitted by them, also changes. Inclination $\alpha$ is shown only schematically FIG. 1. If the vehicle is loaded, the light range is increased which can lead to blinding of oncoming road-users. To permit the adjustment of the light level of the light bundle emitted by headlights 10, the headlights 10 or at least their reflectors 14 can be swivelled about a horizontal axis 11. To keep the light level of the light bundle emitted by headlights 10 at least approximately constant regardless of inclination $\alpha$ of the vehicle which can change, for example, as a result of a load, unevenness of the roadway, or because of braking or acceleration of the vehicle, provision is made for a control device 32 for controlling the light level. This device 32 acts upon setting mechanisms 20 that are allocated to headlights 10 and by which headlights 10 can be swivelled about horizontal axis 11. Device 32 is connected in the area of a front axle 22 of the vehicle to a sensor device 24, and in the area of rear axle 26 of the vehicle to a sensor device 28. An additional sensor device 30 can be arranged on the bodywork of the vehicle, for example on its body 12. As shown in FIG. 1, in particular the additional sensor device 30 can also be arranged on or in a housing 13 of headlight 10, the housing being fixedly joined to the bodywork or body 12 of the vehicle. For example, additional sensor device 30 makes it possible to eliminate influences of the roadway inclination, so that these do not lead to incorrect settings of the light level. Sensor devices 24, 28 and 30 are designed as gradient-sensor devices, for example, by which in each case an angle, lying in a measuring plane, between a defined mounting plane and the direction toward the center of the earth can be detected and supplied to control device 32. Based on these measured quantities, control device 32 is able to determine the vehicle longitudinal inclination $\alpha$.

For example, gradient-sensor devices 24, 28 and 30 can have a pendulum which is able to swivel about an axis running perpendicularly to the measuring plane, and which is drawn by its weight in the direction toward the center of the earth, and whose deflection relative to the mounting plane is evaluated, for instance, through electrical means by way of a potentiometer slider moved by the pendulum. Alternatively, gradient-sensor devices 24, 28 and 30 can also be operative according to the capacitive principle, the gradient-sensor devices then having a mass which is moveable between two capacitor plates, and the capacitance changing in response to the movement of the mass.

Figure 2:
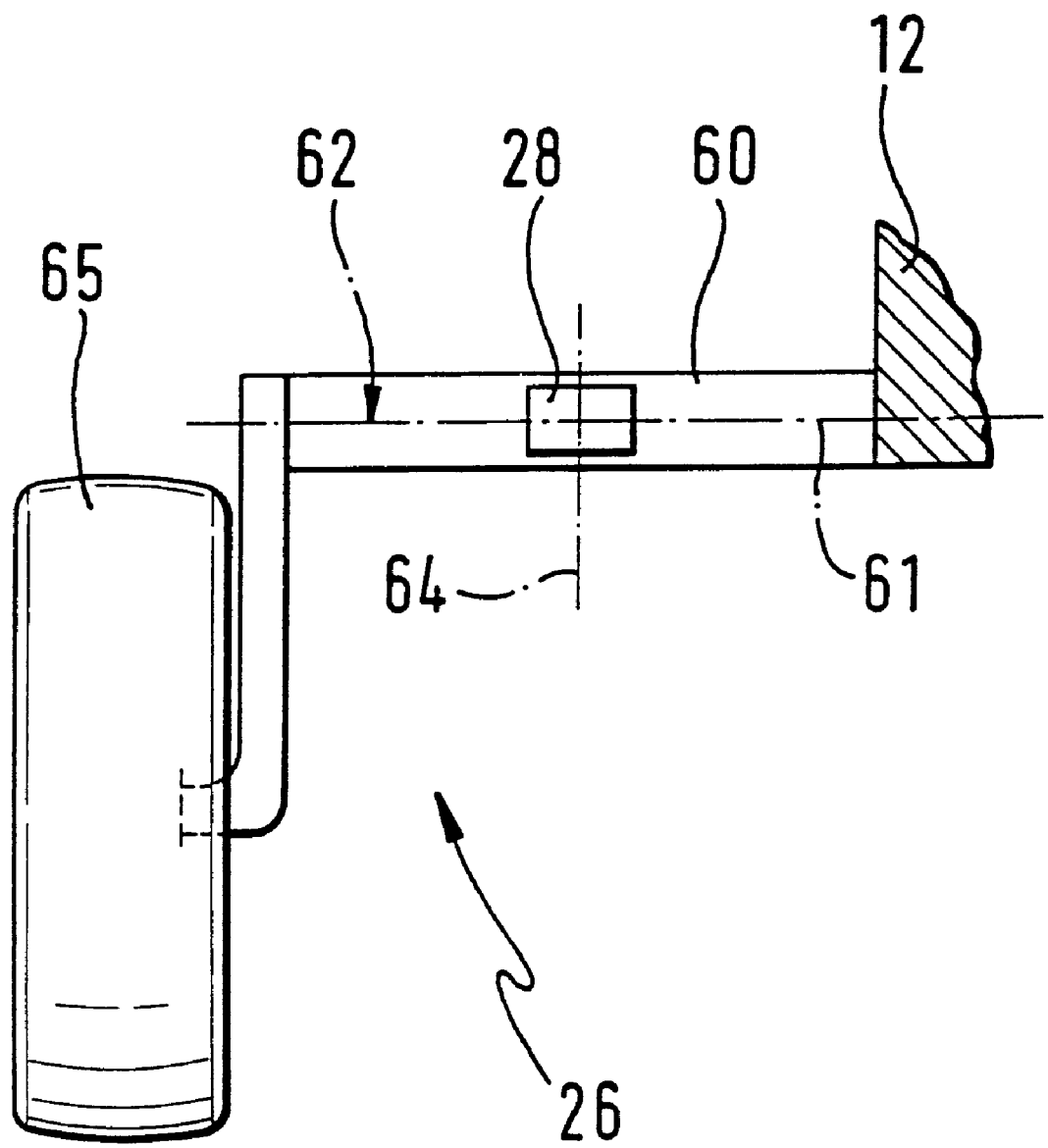
FIG. 2 shows a cutaway view of a preferred embodiment of a wheel suspension of the vehicle.

According to another preferred specific embodiment shown in FIG. 2, gradient-sensor devices 24 and 28 are arranged on torsion bars 60 of vehicle axles 22 and 26, respectively. For example, torsion bars 60 can be arranged in vertical transverse planes 62, the torsion bars twisting about their longitudinal axis 61 in response to a spring deflection or rebound of vehicle bodywork 12. For instance, torsion bars 60 can be affixed at their one end area to vehicle bodywork 12, and at their other end area can be coupled via suspension links to wheels 65 of the vehicle. Gradient-sensor devices 24 and 28 are arranged on torsion bars 60 in such a way that they also twist about longitudinal axis 61 of the torsion bars. In this context, the measuring planes of gradient-sensor devices 24, 28 run as vertical longitudinal planes 64 perpendicular to longitudinal axes 61 of torsion bars 60. Additional gradient-sensor device 30 can be arranged on body 12 in such a way that its measuring plane runs as a vertical longitudinal plane at least roughly parallel to longitudinal planes 64 of gradient-sensor devices 24 and 28 of axles 22 and 26.

A further preferred specific embodiment allows the use of spring-deflection-path sensors, allocated to the vehicle wheels, as sensors. For example, potentiometers or even Hall sensors are possible as spring-deflection-path sensors. Hall sensors are usable in such a way that they can detect a twisting of a torsion bar corresponding to a spring-deflection path.

The vehicle shown in FIG. 1 is also equipped with a slip-control system (ABS/ASR system). This device has an electronic control unit 70 by which the brake pressure acting on wheels 65 or the drive torques of wheels 65 is/are controllable for regulating the vehicle performance. A master brake cylinder 73 is able to receive pressure by way of a brake pedal 74, master brake cylinder 73 being connected to a valve unit 72. Wheel brake cylinders 71 of the respective wheels 65 are connected to this valve unit and are correspondingly acted upon by pressure. Control unit 70 regulates the activity of solenoid-valve unit 72 taking into consideration, inter alia, the detected wheel speeds provided by (schematically shown) wheel-speed sensors 76, whereby the pressures in the individual wheel brake cylinders are adjusted. The control of the drive torques of wheels 65, for example by way of a throttle-valve control, is not shown in detail. The above-described arrangement is shown only for one front wheel in FIG. 1. It applies correspondingly for the other front wheel and the rear wheels.

To optimize the slip control (ABS/ASR control), electronic control unit 70 also receives signals from control device 32 via suitable reception means, the signals representing longitudinal inclination a of vehicle 1. Control device 32 has correspondingly suitable means for transmitting the detected longitudinal-inclination signals to control unit 70. For example, the signals can be transmitted from control device 32 to control unit 70 by way of a BUS system. The data received from control device 32 can then be evaluated in control unit 70 with the aid of suitable processing means.

The data representing the longitudinal inclination of vehicle 1 can likewise be transmitted in corresponding manner to a control device for the control of a quantity describing the yaw rate of the vehicle, for example to FDR- or ESP control devices. In this case, either the vehicle has a further control unit, or control unit 70 corresponds to the control device for controlling a quantity describing the yaw rate of the vehicle, or control unit 70 contains both control devices. The effectiveness of a yaw-rate sensor (not shown) in particular can be optimized in a simple manner by the longitudinal-inclination information from control device 32.

What is claimed is:

1. A method for providing a signal representing a longitudinal inclination of a vehicle, comprising the step of:

transmitting, from a control device for a headlight-leveling control to a control unit, at least one of: (a) measured quantities for ascertaining the signal representing the longitudinal inclination of the vehicle, and (b) the ascertained signal representing the longitudinal inclination of the vehicle, the control unit being for at least one of: (1) a slip control, and (2) a control of a quantity describing a yaw rate of the vehicle.

2. The method according to claim 1, wherein the measured quantities include spring-deflection depths of the vehicle in a front axle region and a rear axle region.

3. The method according to claim 2, further comprising the step of ascertaining the spring-deflection depths using Hall sensors which measure a twisting of a torsion bar.

4. The method according to claim 1, further comprising the step of acquiring the measured quantities using gradient sensors.

5. A control unit for at least one of a slip control and a control of a quantity describing a yaw rate of a vehicle, comprising:

means for receiving, from a control device for a headlight-leveling control, and for processing at least one of: (a) measured quantities for ascertaining a signal representing a longitudinal inclination of a vehicle, and (b) the signal, ascertained from the measured quantities, representing the longitudinal inclination of the vehicle.

6. A control device for a headlight-leveling control of a vehicle, comprising:

means for acquiring measured quantities for determining a signal representing a longitudinal inclination of the vehicle;

means for generating the signal representing the longitudinal inclination of the vehicle as a function of the acquired measured quantities; and means for transmitting, to a control unit, at least one of: (a) the acquired measured quantities, and (b) the generated signal, the control unit being for at least one of a slip control and a control of a quantity describing a yaw rate of the vehicle.

7. The control device of claim 6, wherein said quantity describing a yaw rate of the vehicle is obtained from a gradient-sensor device mounted on a torsion bar.

8. The control unit of claim 5, wherein said quantity describing a yaw rate of the vehicle is obtained from a gradient-sensor device mounted on a torsion bar.

9. The method of claim 1, wherein said quantity describing a yaw rate of the vehicle is obtained from a gradient-sensor device mounted on a torsion bar.

10. A method for providing a signal representing a longitudinal inclination of a vehicle, comprising the step of:

transmitting, from a control device for a headlight-leveling control to a control unit, at least one of: (a) measured quantities for ascertaining the signal representing the longitudinal inclination of the vehicle, and (b) the ascertained signal representing the longitudinal inclination of the vehicle, the control unit being a control of a quantity describing a yaw rate of the vehicle.

11. The method according to claim 10, wherein the measured quantities include spring-deflection depths of the vehicle in a front axle region and a rear axle region.

12. The method according to claim 11, further comprising the step of ascertaining the spring-deflection depths using Hall sensors which measure a twisting of a torsion bar.

13. The method according to claim 10, further comprising the step of acquiring the measured quantities using gradient sensors.

14. A control device for a headlight-leveling control of a vehicle, comprising:
   means for acquiring measured quantities for determining a signal representing a longitudinal inclination of the vehicle;
   means for generating the signal representing the longitudinal inclination of the vehicle as a function of the acquired measured quantities; and
   means for transmitting, to a control unit, at least one of: (a) the acquired measured quantities, and (b) the generated signal, the control unit being for a control of a quantity describing a yaw rate of the vehicle.

15. The control device of claim 14, wherein said quantity describing a yaw rate of the vehicle is obtained from a gradient-sensor device mounted on a torsion bar.

16. A control unit for a control of a quantity describing a yaw rate of a vehicle, comprising:
   means for receiving, from a control device for a headlight-leveling control, and for processing at least one of: (a) measured quantities for ascertaining a signal representing a longitudinal inclination of the vehicle, and (b) the signal, ascertained from the measured quantities, representing the longitudinal inclination of the vehicle, wherein said quantity describing a yaw rate of the vehicle is obtained from a gradient-sensor device mounted on a torsion bar.

17. The method of claim 10, wherein said quantity describing a yaw rate of the vehicle is obtained from a gradient-sensor device mounted on a torsion bar.

* * * * *